(12) United States Patent
Dilts et al.

(10) Patent No.: US 9,087,113 B2
(45) Date of Patent: *Jul. 21, 2015

(54) AUTOMATIC OFFLINE SYNCHRONIZATION OF BROWSER DOCUMENTS

(71) Applicant: LUCID SOFTWARE, INC., Draper, UT (US)

(72) Inventors: Benjamin N. Dilts, Sandy, UT (US); Alma T. Madsen, Lehi, UT (US)

(73) Assignee: LUCID SOFTWARE, INC., South Jordan, UT (US)

( * ) Notice: Subject to any disclaimer, the term of this patent is extended or adjusted under 35 U.S.C. 154(b) by 141 days.

This patent is subject to a terminal disclaimer.

(21) Appl. No.: 14/046,818

(22) Filed: Oct. 4, 2013

(65) Prior Publication Data
US 2014/0040204 A1 Feb. 6, 2014

Related U.S. Application Data

(63) Continuation of application No. 13/361,516, filed on Jan. 30, 2012, now Pat. No. 8,583,614.

(51) Int. Cl.
*G06F 17/30* (2006.01)
*G06F 17/22* (2006.01)

(52) U.S. Cl.
CPC ...... *G06F 17/30575* (2013.01); *G06F 17/2288* (2013.01)

(58) Field of Classification Search
CPC ............ G06F 17/2288; G06F 17/30575
USPC ................................... 707/638, 695
See application file for complete search history.

(56) References Cited

U.S. PATENT DOCUMENTS

| 6,029,175 | A | 2/2000 | Chow et al. |
|---|---|---|---|
| 6,065,026 | A | 5/2000 | Cornelia et al. |
| 6,553,363 | B1 | 4/2003 | Hoffman |
| 7,210,100 | B2 | 4/2007 | Berger et al. |
| 7,756,824 | B2 | 7/2010 | Campbell et al. |
| 8,346,768 | B2 | 1/2013 | Bailor et al. |
| 8,453,052 | B1 | 5/2013 | Newman et al. |
| 2012/0101980 | A1 | 4/2012 | Taleghani et al. |

*Primary Examiner* — Jorge A Casanova
(74) *Attorney, Agent, or Firm* — Maschoff Brennan

(57) ABSTRACT

In an embodiment, a method for synchronizing browser documents is described. The method may include losing a connection to a version control server at a client device having first and second instances of a document open in first and second browser windows of a browser. The method may also include storing a first branch corresponding to the first instance of the document in local storage associated with the first browser. The first branch may indicate whether the first instance of the document is open or abandoned and one or more first changes. The method may also include the second browser window automatically determining that the first instance of the document is abandoned. The method may also include the second browser window automatically merging the one or more first changes into the second instance of the document in response to determining that the first instance of the document is abandoned.

25 Claims, 9 Drawing Sheets

AUTOMATIC OFFLINE SYNCHRONIZATION OF BROWSER DOCUMENTS

CROSS-REFERENCE TO RELATED APPLICATIONS

This patent application is a continuation of U.S. patent application Ser. No. 13/361,516, filed Jan. 30, 2012, which is incorporated herein by reference.

BACKGROUND

1. Field of the Invention

The present invention generally relates to browser documents. More particularly, some example embodiments relate to version control of browser documents in online and/or offline scenarios.

2. Related Technology

Web applications are delivered to end users through a browser and often offer very little functionality. As such, these applications may be built so that most or all of their functionality occurs on a remote server and only results are presented on a client device to the end user. When the connection between the client device and the remote server is lost, the limited functionality offered by the application may prevent the user from viewing past work or continuing to work on an open browser document until the connection is restored.

Some browsers include basic functionality to allow web applications to implement some offline support, but this low-level functionality does little or nothing to mitigate versioning problems inherent in disconnected editing. When multiple users independently make substantial changes to documents, and then subsequently reconnect via a remote server, the remote server and/or the browsers may be unable to merge those changes automatically without involving the users, if at all. Additionally, diverging changes made by a single user to the same document in multiple browser windows with such basic functionality may be difficult or impossible to automatically merge, if at all, without involving the user and/or without a connection to a remote server.

Even if a web application allows for local editing of data while offline, managing how and when that data is eventually synced back to the remote server is another issue that can be difficult to resolve. Some solutions to this problem may waste bandwidth and CPU cycles, may commit duplicate changes to the server, and/or may inadvertently delay the syncing of changes to the server.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein relate to version control of browser documents in online and/or offline scenarios.

In an example embodiment, a method for synchronizing browser documents is described. The method may include losing a connection to a version control server at a client device having a first instance of a document open in a first run time environment and a second instance of the document open in a second run time environment. The method may also include storing a first branch corresponding to the first instance of the document in local storage associated with the first run time environment. The first branch may indicate whether the first instance of the document is open or abandoned and one or more first changes. The method may also include the second run time environment automatically determining that the first instance of the document is abandoned. The method may also include the second run time environment automatically merging the one or more first changes into the second instance of the document in response to determining that the first instance of the document is abandoned. Each of the run time environments may include, but is not limited to, a browser window in a browser.

In an example embodiment, a method of version control implemented substantially without human intervention is described. The method may include, at a first client device having a document open in a browser window, sending to a version control server a first revision number indicating a first version of the document and a first set of one or more changes made at the first client device to the first version of the document. The method may also include, in response to the version control server determining that the first version of the document is outdated, receiving, from the version control server, a rejection of the first set of one or more changes. The method may also include receiving, from the version control server, a second set of one or more changes made to the document at a remote client device and synced to the version control server prior to the version control server receiving the first set of one or more changes from the first client device. The method may also include merging the second set of one or more changes into the first version of the document to create a second version of the document. The method may also include syncing at least one of the first set of one or more changes to the version control server based on the second version of the document.

In an example embodiment, another method of version control implemented substantially without human intervention is described. The method may include receiving, at a version control server, from a first client device having a document open in a browser window, a first revision number indicating a first version of the document and a first set of one or more changes made at the first client device to the first version of the document. The method may also include determining whether the first version of the document is a current version of the document maintained by the version control server. The method may also include, if the first version of the document is the current version of the document, saving the first set of one or more changes by the version control server. Or, the method may also include, if the first version of the document is not the current version of the document, rejecting the first set of one or more changes.

Additional features will be set forth in the description which follows, and in part will be obvious from the description, or may be learned by the practice of the invention. The features may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1:
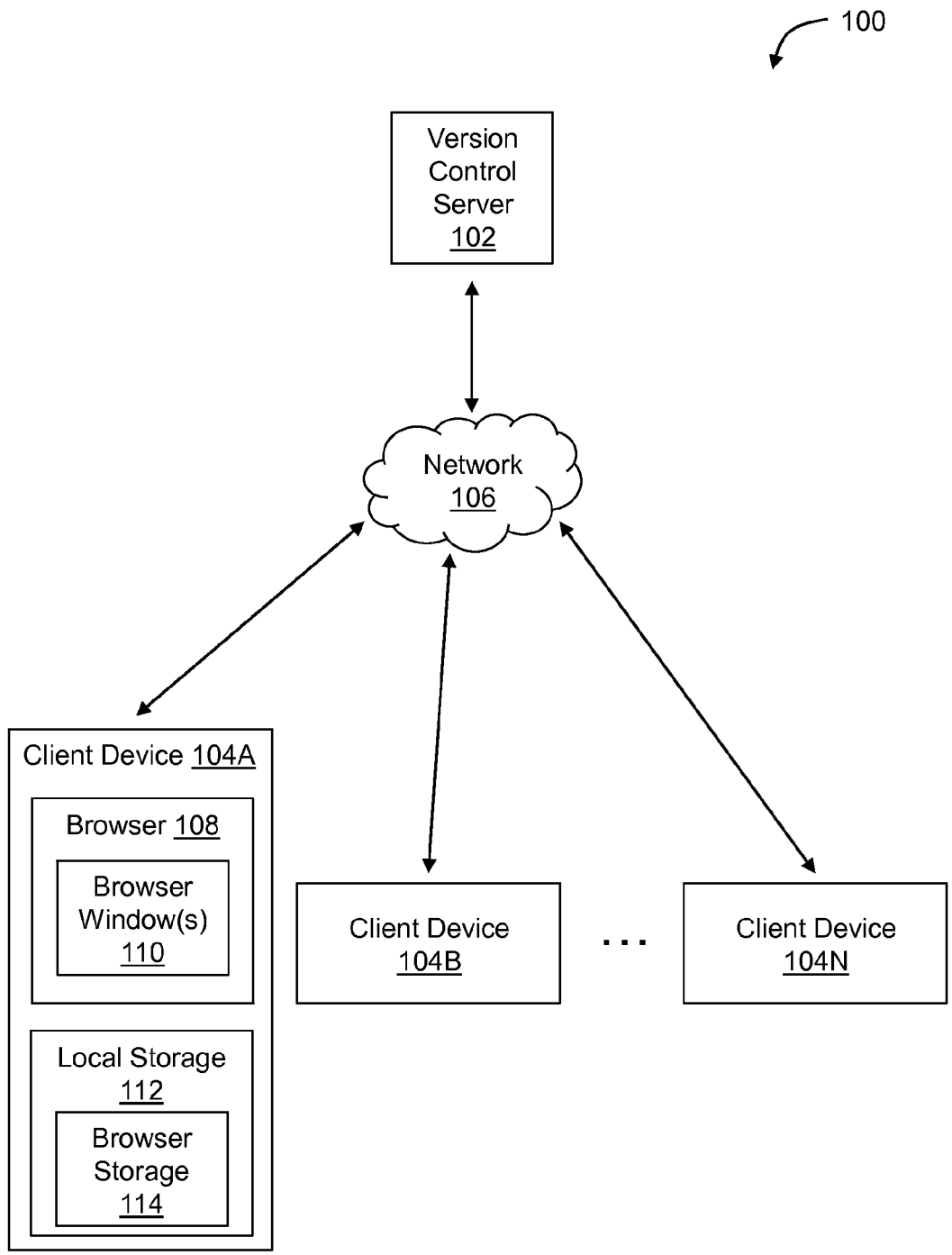
FIG. 1 is a block diagram of an example operating environment including a version control server and multiple client devices.

Embodiments described herein generally relate to version control and synchronization of multiple document instances edited on the same client device or on different client devices. Some embodiments may be implemented in an offline or disconnected mode, an online or connected mode, or in both an offline and online mode. For instance, in an online mode, client devices may sync changes to a version control server that serves multiple client devices that each have an instance (or instances) of a document open and/or in use on the respective client device. When the document is edited and/or changes are made to the document at a first client device, the first client device sends a revision indicator indicating a version of the document and changes made to the version of the document to the version control server. In certain embodiments of the invention, the revision indicator may be a revision number. The version control server may verify that the version of the document identified by the revision number is the current version of the document. If so, the version control server may save the changes and notify the first client device. If not, the version control server may reject the changes and send other changes previously synced to the version control server by a second client device to the first client device. The first client device may then merge the other changes into its version of the document before resubmitting the original changes made at the first client device to the version control server. The foregoing process may be fully automated and transparent to a user of the first client device.

If the first client device loses a connection to the version control server, a user of the first client device can continue to edit instances of the document on the first client device in browser windows in which the instances are open. Alternately or additionally, a new document may be started in a browser window while disconnected from the version control server.

Each browser window in which an instance of the document is open, whether a document that was already open prior to disconnecting from the version control or a new document, may have a branch associated with it. Each branch may indicate the revision number of the instance of the document open in the corresponding browser window and one or more changes that have been applied in the corresponding browser window to the version of the document identified by the revision number. Each branch may also indicate whether the corresponding instance of the branch is open or abandoned. The branches may be stored in local storage associated with the browser.

A user of the first client device can close one or more, or all, instances of the document on the first client device, such as by closing one or more, or all, browser windows pursuant to certain embodiments of the invention. Before the first client device reestablishes a connection to the version control server, the user may re-open and continue editing one or more instances of the document, which may be reloaded in one or more browser windows from the local storage associated with the browser, or the user may start a new document in a browser window as previously mentioned. Thus, some embodiments described herein may enable seamless (e.g., fully automated and transparent) transition from online to offline mode (e.g., a user can continue to edit instances of documents that are open when connection to the version control server is lost), offline mode (user can edit, close, reopen, and/or start new documents while offline), and transition from offline to online mode (e.g., when connection to version control server is reestablished).

Each browser window may periodically poll the local storage to see if any branches on its same document are abandoned. If such an abandoned branch is found, the browser window may locally merge the changes of the abandoned branch into the instance of the document open in the browser window. Thus, if a browser window in which an instance of a document is open is inadvertently closed by the user, any changes made in the closed browser window that have not been synced to the version control server may be automatically and transparently merged into another browser window in which an instance of the same document is open without losing the changes. Alternately or additionally, if no other browser windows are open when the browser window is closed, the changes may be stored locally, along with the rest of the state of synchronization with the version control server. The next time a browser window is opened to the application and/or after the connection to the version control server has been re-established, synchronization may automatically and transparently continue with the version control server. Similarly, if a new document has been started by a user, the new document may be stored locally and when a connection is established with the version control server, synchronization may automatically and transparently begin.

Optionally, any one of multiple browser windows, including a browser window displaying a central document list or any browser window in which an instance of a document is open, may be designated as a master syncer. If the browser window designated as the master syncer is closed, another one of the multiple browser windows may negotiate with other open browser windows, either through local storage or other mechanisms, and be designated in its place as the master syncer.

The negotiation process may proceed according to many different methods, and according to certain embodiments of the invention one of the multiple browser windows may designate itself as the master syncer. For example, according to one embodiment of the invention the negotiation process makes use of shared web workers supported in a browser, and according to another embodiment the negotiation process makes use of semaphores implemented using local storage. The above embodiments are by way of example and not limitation, and it will be apparent to those of ordinary skill in the art that other methods may be used to implement the negotiation process.

If all browser windows are closed, the master syncer's state may be preserved in local storage until, for example, a new browser window is opened and designates itself as the master syncer. The master syncer may periodically check local storage for all abandoned branches and transparently sync changes from the abandoned branches to the version control server when a connection is available. The master syncer may alternately or additionally manage getting updates from the version control server to all documents having one or more instances open on the first client device when a connection is available. When the connection to the version control server is lost, the user may thereby continue editing any document from the latest version available at the time of the disconnection.

FIG. 1 is a block diagram of an example operating environment 100 including a version control server 102 (hereinafter "server 102") and multiple client devices 104A, 104B up to 104N (hereinafter "client devices 104"), arranged in accordance with at least some embodiments described herein. The operating environment 100 may additionally include a network 106.

In general, the network 106 may include one or more wide area networks (WANs) and/or local area networks (LANs) that enable the server 102 and the client devices 104 to communicate with each other. In some embodiments, the network 106 includes the Internet, including a global internetwork formed by logical and physical connections between multiple WANs and/or LANs. Alternately or additionally, the network 106 may include one or more cellular RF networks and/or one or more wired and/or wireless networks such as, but not limited to, 802.xx networks, Bluetooth access points, wireless access points, IP-based networks, or the like. The network 106 may also include servers that enable one type of network to interface with another type of network.

Each of the client devices 104 may execute an application, such as a browser 108, configured to communicate through the network 106 with the server 102. While only client device 104A is illustrated as executing the browser 108 in FIG. 1, each of the other client devices 104B to 104N may be similarly configured to execute a browser 108. The browser 108 may include an Internet browser or other suitable application. The browser 108 may download and/or interact with content, such as web pages, documents, and/or applications hosted by the server 102 or other servers (not shown) in the operating environment 100. For instance, one or more instances of one or more documents can be opened in the browser 108, each document instance being opened in a different browser window 110 of the browser 108. In some embodiments, each browser window 110 may run as a separate process from other browser windows 110 to isolate crashes. Each of the client devices 104 may include, but is not limited to, a desktop computer, a laptop computer, a mobile phone, a smartphone, a personal digital assistant (PDA), or other suitable client device.

Each of the client devices 104 may additionally include local storage 112. While only client device 104A is illustrated as including local storage 112 in FIG. 1, each of the other client devices 104B to 104N may be similarly configured. The local storage 112 may include volatile memory such as random access memory (RAM), persistent or non-volatile storage including, but not limited to, read only memory (ROM), electrically erasable and programmable ROM (EEPROM), compact disc-ROM (CD-ROM) or other optical disk storage, magnetic disk storage or other magnetic storage device, NAND flash memory or other solid state storage device, or other persistent or non-volatile computer-readable storage medium. At least a portion 114 of the local storage 112 may be designated for use by or otherwise associated with the browser 108. The portion 114 of the local storage 112 may be referred to herein as "browser storage 114."

The server 102 may be configured to communicate through the network 106 with the client devices 104 and to coordinate the syncing of documents edited and modified by client devices 104. In certain embodiments, the server 102 may maintain revision lists corresponding to web documents that can be accessed and edited by the client devices 104. The revision lists may be used to coordinate the syncing of the corresponding web documents, each of which may be accessed and edited, at the same or different times, by two or more of the client devices 104.

Figure 2:
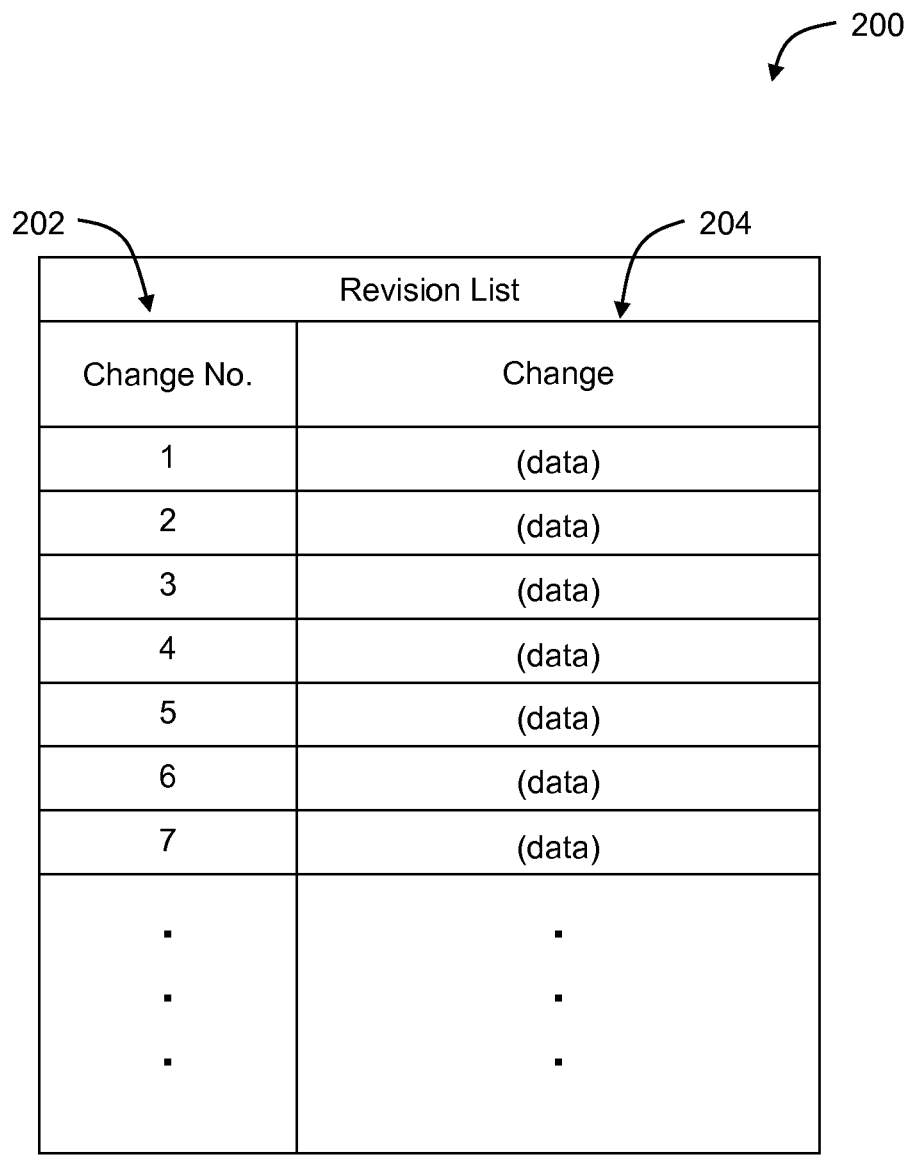
FIG. 2 illustrates an example revision list that may be maintained by the version control server of FIG. 1.

FIG. 2 illustrates an example revision list 200 that may be maintained by the version control server of FIG. 1, arranged in accordance with at least some embodiments described herein. In the illustrated embodiment, the revision list 200 includes a list of one or more change numbers 202 and corresponding changes 204. In certain embodiments, the server 102 may not necessarily maintain a version of a document corresponding to the revision list 200. Rather, the revision list 200 may be maintained by the server 102 without maintaining a version of the document and may include enough information to reconstruct the document from a template or blank document by simply applying all the changes 202 to the template or blank document. In these and other embodiments, the changes 202 that may be included in the revision list 200 may include, but are not limited to, creating an object, deleting an object, modifying the font/font size of a text object, modifying the outline/fill/effects of an object, changing the position of an object, creating a page, removing a page, editing the content of a text area, reordering pages, adding rows, fields, or columns to tabular objects, adjusting the vector appearance of a particular object, renaming the document, grouping objects together or breaking them apart, aligning objects spatially, or the like. According to certain embodiments of the invention, each of these changes is reversible, and some such changes may be reversals of earlier changes.

Figures 3A, 3B:
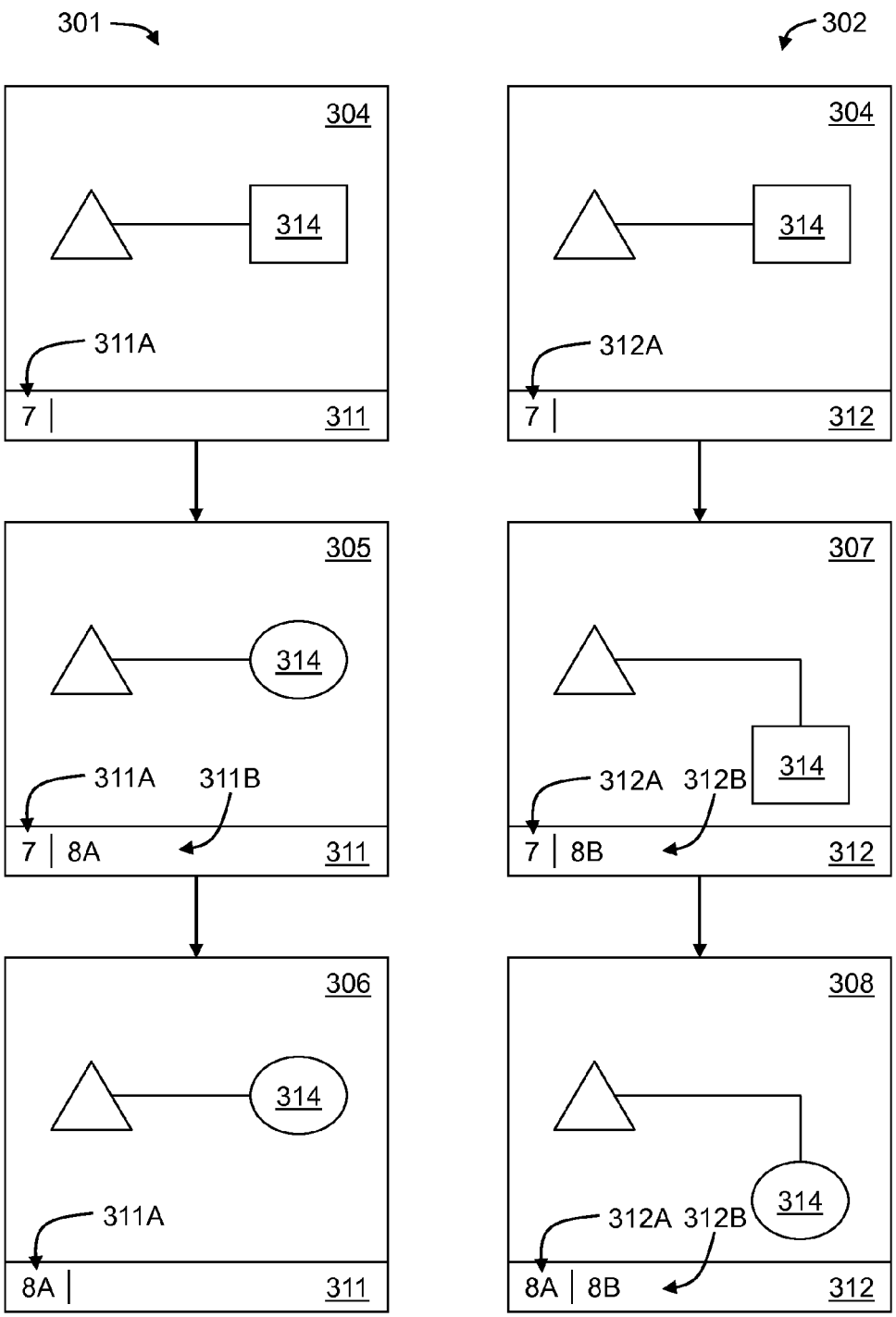
FIGS. 3A-3C illustrate various time progressions of different instances of the same document edited on different client devices and/or in different browser windows on the same client device.
Figure 3C:
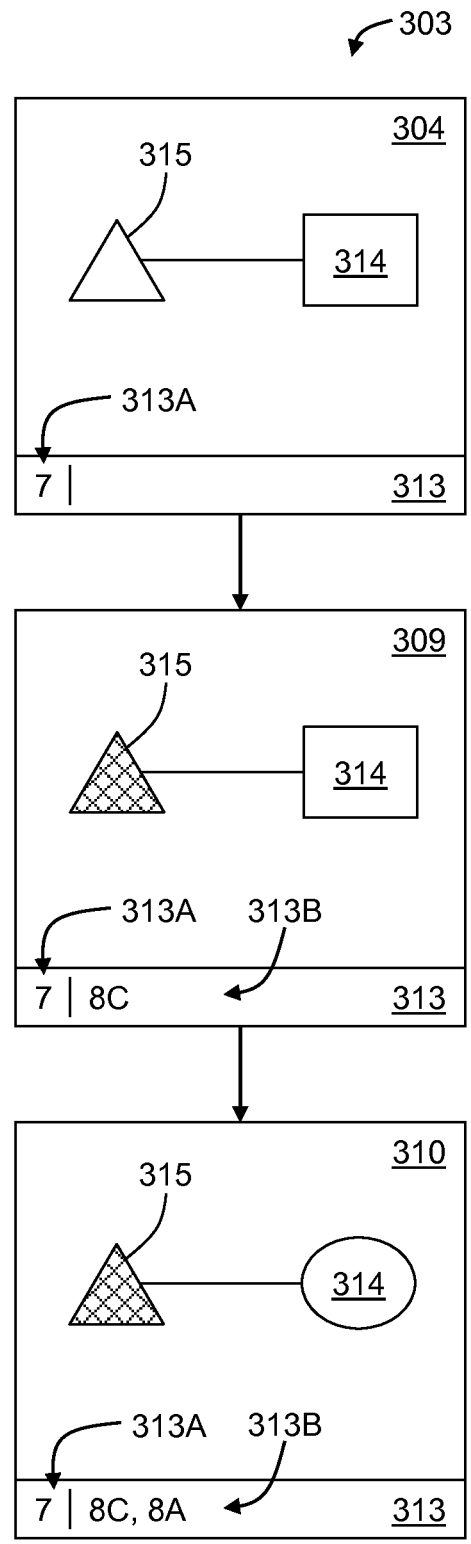

FIGS. 3A-3C illustrate various time progressions of different instances 301-303 of the same document edited on different client devices and/or in different browser windows on the same client device, arranged in accordance with at least some embodiments described herein. In more detail, FIG. 3A illustrates a time progression of a first instance 301 of the document on a first client device, such as the client device 104A of FIG. 1, FIG. 3B illustrates a time progression of a second instance 302 of the document on a second client device, such as the client device 104B of FIG. 1, and FIG. 3C illustrates a time progression of a third instance 303 of the document on the same first client device as in FIG. 3A but in a different browser window than the first instance 301 of the document.

Each of FIGS. 3A-3C includes three "snapshots" of the corresponding instance 301-303 of the document at different times as the instance 301-303 of the document is edited. In the present specification, "snapshot" refers to a screenshot of the instance 301-303 of the document at a particular time. FIG. 3A includes snapshots 304-306, FIG. 3B includes snapshots 304 and 307-308, and FIG. 3C includes snapshots 304 and 309-310. As can be seen from FIGS. 3A-3C, each of the time progressions of FIGS. 3A-3C begins at the same starting point, e.g., at snapshot 304, for convenience in describing some of the embodiments herein.

In some embodiments, a branch 311-313 is stored in the browser storage 114 for each instance 301-303 of the document open in a corresponding browser window 110 on a corresponding client device. Each branch 311-313 may include a revision number 311A, 312A, 313A identifying a version of the document upon which each instance 301-303 is based and one or more local changes 311B, 312B, 313B made in each instance 301-303 to the version of the document identified by the revision number 311A, 312A, 313A. Each branch 311-313 is graphically represented in FIGS. 3A-3C at the bottom of each snapshot 301-307. In general, however, each branch 311-313 is not displayed and/or may be in a different format than shown in FIGS. 3A-3C.

In FIGS. 3A-3C, the revision number 311A, 312A, 313A is arbitrarily shown as revision number 7 at least for the first snapshot 304 of each instance 301-303 of the document. In general, the version of the document identified by the revision number 311A, 312A, 313A may be an "official" version of the document. A version of a document is an "official" version if all of the changes in that version have been stored at the server 102 (FIG. 1), e.g., in the revision list 200 (FIG. 2) maintained by the server 102 for that document. Alternately or additionally, and with combined reference to FIGS. 2 and 3A-3C, the revision number 311A, 312A, 313A may correspond to the last change number 202 of the last change 204 saved to the revision list 200 for the document.

Various aspects of version control according to some embodiments will now be described with respect to FIGS. 1-3B. As shown in the time progression of FIG. 3A, a first user of the first client device 104A having a browser window 110 with the first instance 301 of the document may edit the first instance 301 of the document. In particular, the first user may change the outline of an object 314 from a rectangle to an oval as seen in snapshot 305 of FIG. 3A. The outline change of the object 314 may be locally recorded in browser storage 114 in the branch 311 for the first instance 301 of the document shown in FIG. 3A as change 8A (311B) as shown in the snapshot 305.

To sync the change 8A to the server 102, the first client device 104A sends the revision number 7 (311A) and the change 8A (311B) of the first instance 301 to the server 102. The server 102 determines whether the version of the document identified by the revision number 7 (311A) is the current version of the document. For instance, the server 102 may compare the revision number 7 (311A) to the revision list 200 and if the revision number 7 is the same as the last change number 202 in the revision list 200, the server may determine that the version of the document identified by the revision number 7 (311A) is the current version of the document. Accordingly, the server 102 may update the revision list 200 to include the change 8A (311B) and notify the first client device 104A that the change 8A (311B) was saved at the server 102. In response, and as illustrated in the snapshot 306 of FIG. 3A, the first client device 104A may update the revision number 311A from revision number 7 to revision number 8A to reflect that the last local change 8A sent to the server 102 was saved to the server 102.

In the time progression of FIG. 3B, a second user of the second client device 104B having a browser window with the second instance 302 of the document may edit the second instance 302 of the document. In particular, the second user may change the position of the object 314 from the position shown in the snapshot 304 to the position shown in the snapshot 307. The position change of the object 314 may be locally recorded in browser storage in the branch 312 for the second instance 302 of the document shown in FIG. 3B as change 8B (312B) as shown in the snapshot 307.

To sync the change 8B to the server 102, the second client device 104B sends the revision number 7 (312A) and the change 8B (312B) of the second instance 302 to the server 102. The server 102 determines whether the version of the document identified by the revision number 7 (312A) is the current version of the document. For instance, the server 102 may compare the revision number 7 (312A) to the revision list 200 and if the revision number 7 is the less than the last change number 202 in the revision list 200, the server may determine that the version of the document identified by the revision number 7 (312A) is not the current version of the document and is outdated.

It is assumed in this example that the change 8A has already been synced to the server 102 by the first client device 104A such that the version of the document identified by revision number 7 (312A) is no longer the current version of the document. Accordingly, the server 102 may send the second client device 104B a rejection of the change 8B and may also send any intervening changes made to the document since revision number 7 to the second client device 104B. In some embodiments, such intervening changes can be determined from the revision list 200 as any change with a higher change number than the revision number received from the second client device 104B. In this case, it is assumed that the change 8A is the only intervening change that has been made to the document since revision number 7, and the change 8A is sent to the second client device 104B.

The second client device 104B may then merge the changes received from the server 102 into the second instance 302 of the document followed by attempting to sync the local changes to the server 102 again. In particular, the second client device 104B may undo the change 8B (and any other changes made to the version of the document identified by the revision number 312A) and apply the change 8A received from the server 102 (and any other changes received from the server 102) to the second instance 302 of the document. In this case, applying the change 8A received from the server 102 includes changing the outline of the object 314 from a rectangle to an oval. After the changes received from the server 102 have been applied, the second instance 302 of the document is synchronized with the "official" version of the document, which may be reflected by an update of the revision number 312 to 8A in the branch 312 of the second instance 302 as shown in the snapshot 308 of FIG. 3B.

Additionally, the change 8B can be applied to the synchronized second instance 302 of the document by changing the position of the now oval-shaped object 314 to the position shown in snapshot 308. The second client device 104B then attempts to synchronize the change 8B to the server 102 in the manner described above with respect to FIG. 3A. In particular, the second client device 104B sends the revision number 8A (312A) and the change 8B to the server 102, and if the version of the document identified by the revision number 8A (312A) is the current version of the document, the change 8B can be saved by the server 102 and notification sent to the second client device 104B that the local change 8B was saved to the server 102.

Various aspects of synchronizing browser documents on the same client device, e.g., the first client device 104A, in an offline mode according to certain embodiments of the invention will now be described with respect to FIGS. 1, 3A and 3C. As previously mentioned, each of the first and third instances 301, 303 of the document shown in FIGS. 3A and 3C are open in different browser windows 110 on the first client device 104A. Moreover, it is assumed for this example that a connection with the server 102 is lost before the change 8A shown in the snapshot 305 can be synced to the server 102. As such, the revision number 311A for this example is not updated to 8A since the change 8A is not synced to the server 102 and the snapshot 306 will be disregarded for this example.

As shown in the time progression of FIG. 3C, the first user may edit the third instance 303 of the document that is open in a different browser window 110 than the first instance 301 of the document. In particular, the first user may change the fill of an object 315 from blank as shown in the snapshot 304 to the pattern shown in the snapshot 309. The fill change of the object 315 may be locally recorded in browser storage 114 in the branch 313 for the third instance 303 of the document shown in FIG. 3C as change 8C (313B) as shown in the snapshot 309.

Each of the browser windows 110 in which the first and second instances 301, 303 are open may periodically mark its branch 311, 313 in browser storage 114 as open. For instance, each browser window 110 may periodically mark the respective branch 311, 313 with a timestamp as an indication that the corresponding first or second instance 301, 303 of the document is open in a respective browser window 110 as of the date/time indicated by the timestamp.

Each of the browser windows 110 may also periodically poll the browser storage 114 to check for any abandoned branches 311 or 313 corresponding to the same document. For instance, each browser window 110 with the first or third instance 301, 303 may poll the browser storage 114 to check whether the branch 313, 311 has been abandoned. For example, according to certain embodiments of the invention, a branch or instance of a document may be considered abandoned if the browser window open to the document to which the branch belongs has been closed. A branch may also become abandoned if a browser window changes from one document to another, for example as a result of saving a copy of a document as a new document and retaining the new document open in the browser window. A browser window may determine that an instance of the document has been closed or abandoned if the last time its branch was marked, as indicated by its timestamp, occurred more than a predetermined threshold amount of time prior to a current time.

In this example, it is assumed that the browser window 110 with the third instance 303 determines that the branch 311 of the first instance 301 has been abandoned. This determination may be made automatically without human involvement by polling the browser storage 114 as already described. In response, the browser window 110 with the third instance 303 may merge the local changes from the first instance 301 that have not been synced to the server 102 into the third instance 303 so that the local changes from the first instance 301 that have not been synced are not lost. The merging may occur automatically without human involvement.

In the present example, the local changes from the first instance 301 include the change 8A, which is merged into the third instance 303 by changing the shape of the object 314 from rectangle to oval as illustrated in the snapshots 309 and 310 of FIG. 3C. Moreover, the local changes 313B in the branch 313 of the third instance 303 may be updated to include the change 8A in addition to the local change 8C. When a connection to the server 102 is restored, any changes included in the local changes 313B of the branch 313 of the third instance 303 can then be synced to the server 102. In this manner, even when there is no connection with the server 102, the first user can edit one or more instances of the same document on the first client device 104B and/or close browser windows including instances of the document in which local changes have been made without losing the local changes when the browser windows are closed. Rather, the local changes from the closed browser windows can be merged into instances open in other browser windows. Alternately or additionally, if the last browser window with an instance of a document is closed, the branch of that browser window, including local changes made by the user in that browser window as well as any local changes merged from other instances that were closed previously, can be maintained in the browser storage 114 at least until the client device is reconnected to the server 102 and the local changes stored in the branch are synced to the server 102.

Thus, according to certain embodiments of the invention described herein, local changes at a client device from a first instance of a document may be merged with changes from a second instance when the first instance is closed or abandoned. Alternately or additionally, multiple local instances of a document can be synchronized substantially in real time, without for example waiting until a document instance is abandoned before merging the changes from the document instance.

Figure 4:
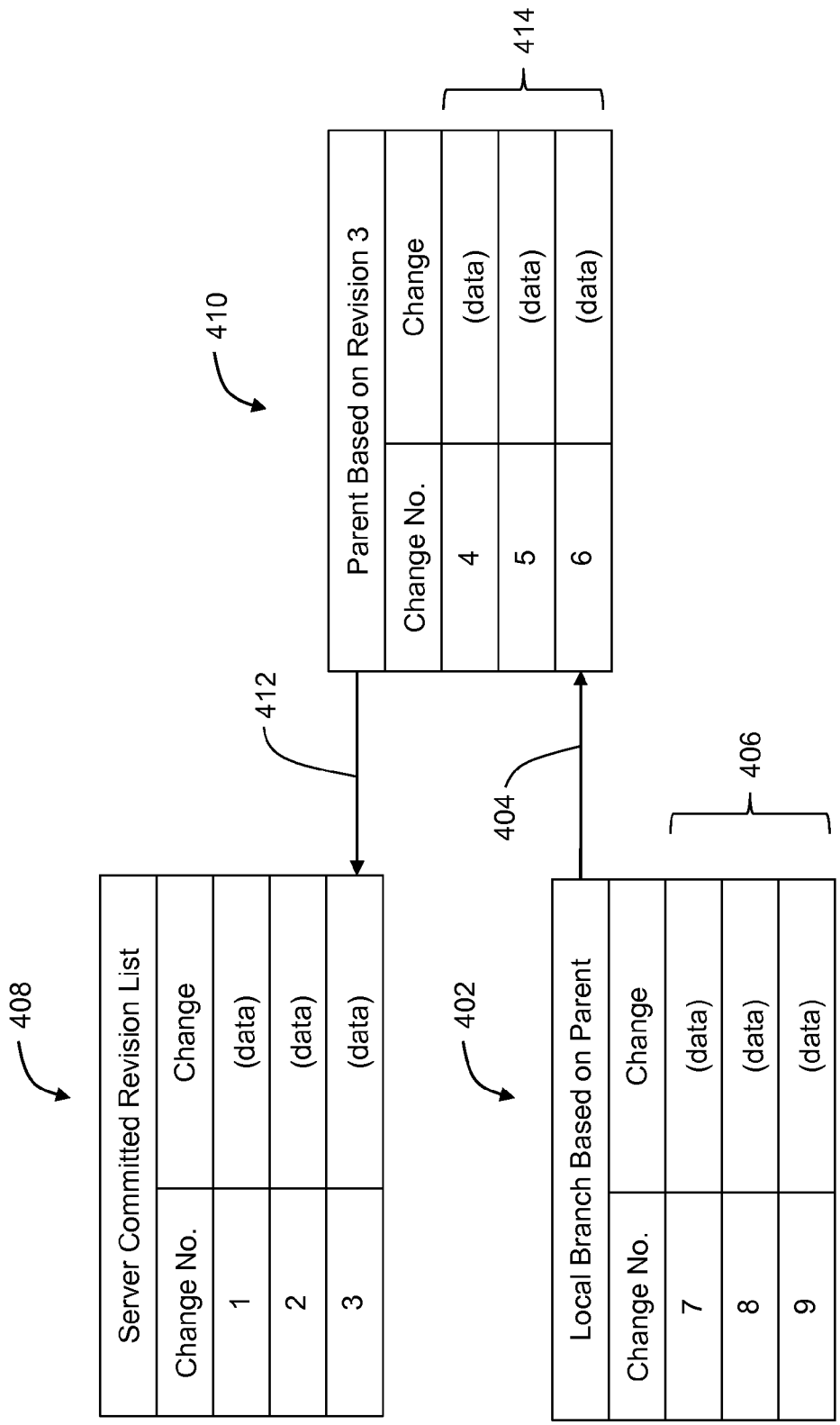
FIG. 4 illustrates aspects of a local version control method that may be implemented on a client device when disconnected from a version control server

For example, according to certain embodiments of the invention and with reference to FIG. 4, one or more local branches 402 may each include a reference 404 to a base revision, and a series of changes 406 that have been applied on top of the base revision. The reference 404 to the base revision may refer to a revision list 408 that has already been committed to the version control server (hereinafter the "server committed revision list 408"), or may refer to another local branch 410 (hereinafter the "parent local branch 410"). The server committed revision list 408 may correspond to the revision list 200 of FIG. 2. The parent local branch 410 may include a reference 412 to the server committed revision list 408.

While disconnected from the version control server, each of the local branches 402 may sync with the parent local branch 410 in the same or a similar manner as they would otherwise sync with the server committed revision list at the version control server, causing a series of changes 414 in the parent local branch 410 to be updated to reflect and sync changes received from the local branches 402 and/or changes received directly in the parent local branch 410 from the user. After a connection is re-established, the parent local branch 410 may then sync the series of changes 414 to the version control server as described herein.

Multiple browser windows open to the same document on a client device may thus merge their changes together even without access to the version control server, by merging their changes locally into a single parent local branch that is based on the server committed revision list, and then adjusting their own local branches to refer to the parent local branch as their base revision. By rapidly and automatically applying this process, multiple browser windows can remain in sync with each other in substantially real-time even when they have no connection to the version control server.

Figure 5A:
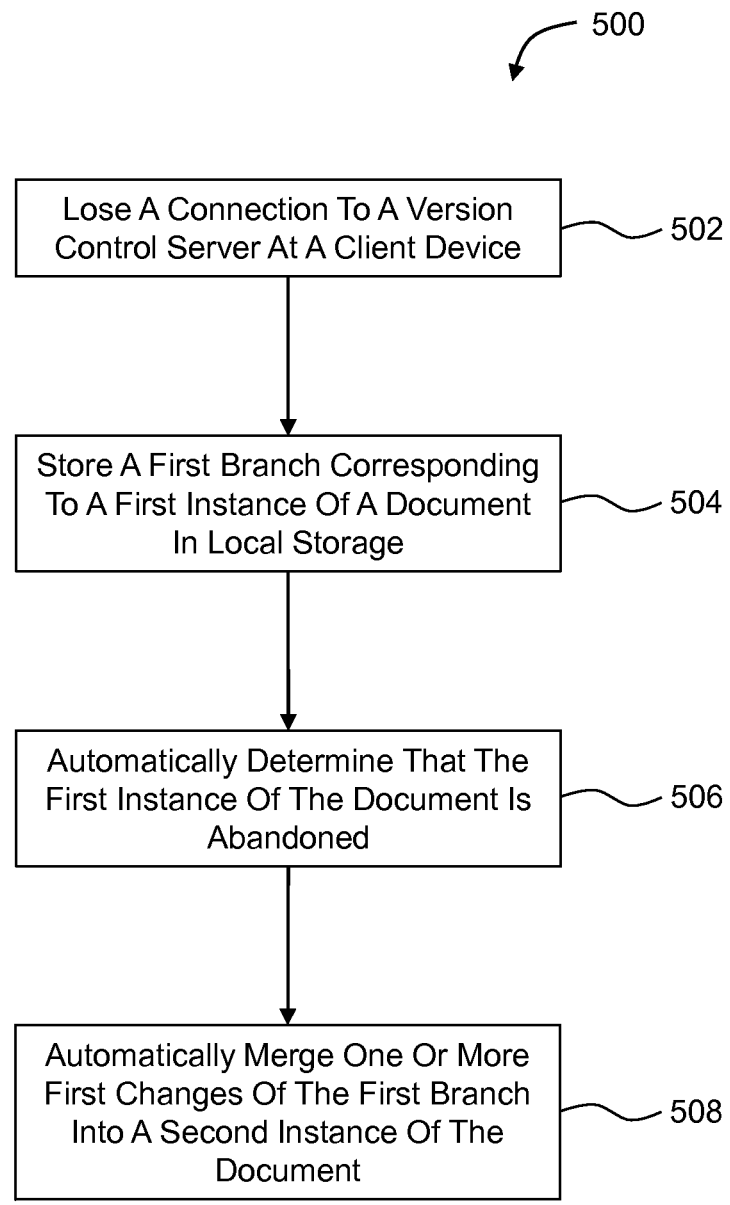
FIG. 5A shows an example flow diagram of a method for synchronizing browser documents on a client device.

Various example methods associated with some embodiments described herein will now be described with reference to FIGS. 5A-5C. Referring first to FIG. 5A, an example flow diagram of a method 500 for synchronizing browser documents on a client device is illustrated, arranged in accordance with at least some embodiments described herein. The method 500 may be performed in whole or part by, e.g., any or all of the client devices 104 of FIG. 1. The method 500 includes various operations, functions or actions as illustrated by one or more of blocks 502, 504, 506 and/or 508. The method 500 may begin at block 502.

In block 502, a connection to a version control server is lost at a client device. The client device may have a first instance of a document open in a first browser window of a browser and a second instance of the document open in a second browser window of the browser.

In block 504, a first branch corresponding to the first instance of the document may be stored in local storage associated with the browser, such as in browser storage 114 (FIG. 1). The first branch may indicate whether the first instance of the document is open or abandoned. For instance, the first branch may include a timestamp or other mark periodically marked on the first branch by the first browser window, such as a timestamp marked on the first branch every five seconds, or some other frequency. The age of the timestamp may indicate whether the document is open or abandoned in some embodiments.

Alternately or additionally, the first branch may indicate one or more first changes. The one or more first changes may include one or more local changes made to the first instance of the document within the first browser window. Alternately or additionally, the first branch may further indicate a revision number of the document identifying a version of the document to which the one or more first changes were applied in the first instance of the document open in the first browser window.

In block 506, the second browser window may automatically determine, e.g., without human involvement, that the first instance of the document is abandoned. In these and other embodiments, the first browser window may periodically mark the first branch as open, e.g., by periodically marking the first branch with a timestamp. Accordingly, automatically determining that the first instance of the document is abandoned may include the second browser window determining that a last time the first branch was marked as open occurred more than a predetermined threshold amount of time prior to a current time.

In block 508, the second browser window may automatically merge, e.g., without human involvement, the one or more first changes of the first branch into the second instance of the document. The merge may occur in response to determining that the first instance of the document is abandoned.

Some embodiments disclosed herein include an article of manufacture such as a computer storage medium having instructions stored thereon that are executable by a computing device to perform operations included in the method 500 of FIG. 5A, such as the operations illustrated by blocks 502, 504, 506 and/or 508 in FIG. 5A, and/or variations thereof. The computer storage medium may be included in one or more of the client devices 104 of FIG. 1. The computing device may include any of the client devices 104, and/or a processor or other processing device of the client devices 104.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, the method 500 may further include deleting the first branch after merging the one or more first changes from the first branch into the second instance of the document.

Alternately or additionally, the method 500 may further include storing a second branch corresponding to the second instance of the document in the local storage associated with the browser. The second branch may indicate whether the second instance of the document is open or abandoned and one or more second changes such that the one or more second changes can be merged into other instances of the document opened in other browser windows after the second instance of the document is abandoned. In these and other embodiments, merging the one or more first changes into the second instance of the document at block 508 may include applying at least some of the one or more first changes to the second instance of the document and adding the at least some of the one or more first changes to the second branch stored in the local storage associated with the browser.

It may be the case that some of the one or more first changes are inconsistent with and/or are not merged into the second instance of the document. For instance, if the one or more first changes include changes to an object that has been deleted in the second instance of the document, it may be the case that the changes to the object are not applied in the second instance since the object has been deleted in the second instance. In these and other embodiments, each change stored in each branch may have a timestamp and timestamps may be analyzed in determining how to handle cases such as these. For instance, if a timestamp for deleting the object in the second instance is earlier than a timestamp for changing the object in the first instance, the subsequent changes to the object may suggest that the user would like to keep and modify the object despite the earlier deletion such that merging the one or more first changes (including the changes to the object) into the second instance of the document may include undeleting the object and applying the changes to the object in the second instance. Alternately, if the timestamp for deleting the object in the second instance is subsequent to the timestamp for changing the object in the first instance, the subsequent deletion of the object may suggest that the user would like to delete the object despite the earlier changes such that merging the one or more first changes (including the changes to the object) into the second instance of the document may include disregarding the changes to the object in the second instance.

Alternately or additionally, the method 500 may further include receiving input effective to cause the one or more first changes in the first instance of the document after losing the connection to the version control server. The input may be received from a user of the client device through an input device of the client device, for example. Accordingly, some embodiments described herein allow offline editing of documents.

Alternately or additionally, the method 500 may include the second browser window periodically polling the local storage associated with the browser prior to the second browser window automatically determining that the first instance of the document is abandoned. The periodic polling may be performed by the second browser window to determine whether any branches of the document, including the first branch, are abandoned.

Alternately or additionally, the method 500 may further include designating any one of multiple browser windows that include the first and second browser windows as a master syncer. The master syncer may be responsible for syncing all changes for all instances of all documents that are open on the client device to the version control server when the client device is connected to the version control server. In these and other embodiments, the method 500 may further include reconnecting the client device to the version control server. The master syncer may then periodically poll the local storage to determine any instances of any documents that have been abandoned where each of the instances has a corresponding branch stored in the local storage and each branch indicates one or more changes to a corresponding document. The master syncer may sync the one or more changes of each branch corresponding to each abandoned instance to the version control server.

Optionally, the master syncer may be used to centrally manage getting updates to all documents from the version control server. In these and other embodiments, the method 500 may include the master syncer may receiving one or more updates from the version control server to one or more documents where each of the one or more documents has at least one instance open in a corresponding browser window on the client device. The master syncer may distribute the one or more updates to one or more corresponding browser windows. Each of the one or more corresponding browser windows may merge the one or more updates into a corresponding instance of the document.

Figure 5B:
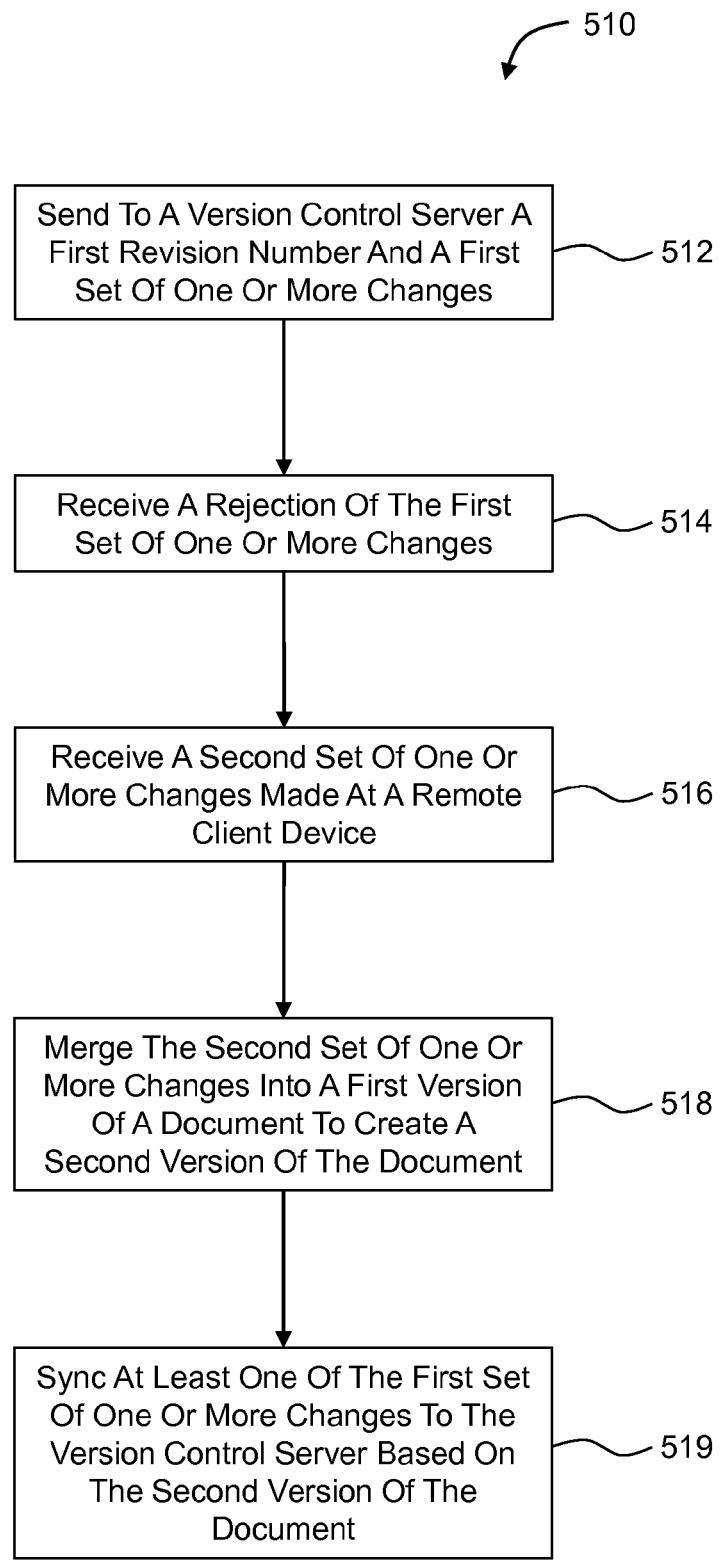
FIG. 5B shows an example flow diagram of a method of version control that can be implemented substantially without human intervention.

FIG. 5B shows an example flow diagram of a method of version control that can be implemented substantially without human intervention, arranged in accordance with at least some embodiments described herein. The method 510 may be performed in whole or in part by, e.g., any or all of the client devices 104 of FIG. 1. The method 510 includes various operations, functions or actions as illustrated by one or more of blocks 512, 514, 516, 518 and/or 519. The method 510 may begin at block 512.

At block 512, at a first client device having a document open in a browser window, a first revision number indicating a first version of the document and a first set of one or more changes made at the first client device to the first version of the document is sent to a version control server.

At block 514, the first client device receives a rejection of the first set of one or more changes from the version control server. The rejection may be received in response to the version control server determining that the first version of the document is outdated, e.g., that the first version of the document is not a current version of the document.

At block 516, a second set of one or more changes made to the document at a remote client device and synced to the version control server prior to the version control server receiving the first set of one or more changes from the first client device is received from the version control server.

At block 518, the second set of one or more changes is merged into the first version of the document to create a second version of the document. Merging the second set of one or more changes into the first version of the document to create a second version of the document may include undoing the first set of one or more changes made to the first version of the document and applying the second set of one or more changes to the first version of the document to create the second version of the document.

At block 519, at least one of the first set of one or more changes is synced to the version control server based on the second version of the document. Syncing at least one of the first set of one or more changes to the version control server based on the second version of the document may include applying at least one of the first set of one or more changes to the second version of the document. The at least one of the first set of one or more changes may include as many of the first set of one or more changes as possible given any differences between the first and second versions of the document. The first client device may then send to the version control server a second revision number indicating the second version of the document and the at least one of the first set of one or more changes made at the first client device to the second version of the document. In response to the version control server determining that the second version of the document is a current version of the document, the first client device may receive, from a the version control server, a notification that the at least one of the first set of one or more changes was saved by the version control server.

Alternately or additionally, the method 510 may further include sending to the version control server a third revision number indicating a third version of the document and a third set of one or more changes made at the first client device to the third version of the document. In response to the version control server determining that the third version of the document is a current version of the document, the first client device may receive, from the version control server, a notification that the third set of one or more changes was saved by the version control server.

Alternately or additionally, the first client device may have first and second instances of the document open in first and second browser windows of a browser. In these and other embodiments, the method 510 may further include losing a connection to the version control server at the client device. A first and second branch corresponding to the first and second instance of the document may be stored in local storage associated with the browser. Each branch may indicate whether the corresponding instance of the document is open or abandoned and one or more changes made to the corresponding instance of the document. The second browser window may automatically determine that the first instance of the document is abandoned. The second browser window may automatically merge the one or more changes made to the first instance of the document into the second instance of the document in response to determining that the first instance of the document is abandoned.

Some embodiments disclosed herein include an article of manufacture such as a computer storage medium having instructions stored thereon that are executable by a computing device to perform operations included in the method 510 of FIG. 5B, such as the operations illustrated by blocks 512, 514, 516, 518 and/or 519 in FIG. 5B, and/or variations thereof. The computer storage medium may be included in one or more of the client devices 104 of FIG. 1. The computing device may include any of the client devices 104, and/or a processor or other processing device of the client devices 104.

Figure 5C:
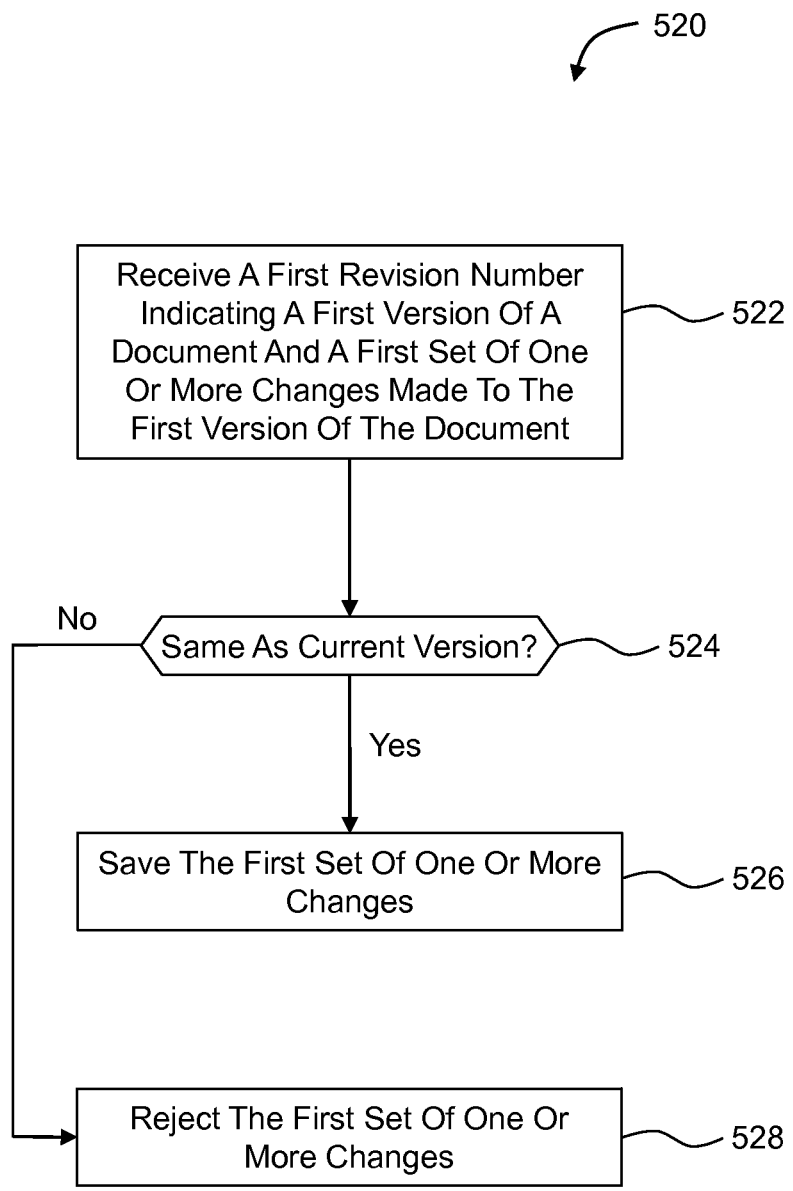
FIG. 5C shows an example flow diagram of another method of version control that can be implemented substantially without human intervention.

FIG. 5C shows an example flow diagram of another method 520 of version control that can be implemented substantially without human intervention, arranged in accordance with at least some embodiments described herein. The method 520 may be performed in whole or in part by, e.g., the server 102 of FIG. 1. The method 520 includes various operations, functions or actions as illustrated by one or more of blocks 522, 524, 526 and/or 528. The method 520 may begin at block 522.

In block 522, a first revision number indicating a first version of a document and a first set of one or more changes made to the first version of the document is received at a version control server from a first client device. The first client device may have a document open in a browser window. The first set of one or more changes may have been made at the first client device to the first version of the document.

In decision block 524, it is determined whether the first version of the document is a current version of the document maintained by the version control server. Determining whether the first version of the document is a current version of the document may include comparing the first revision number to a revision number corresponding to the current version of the document. If the first revision number is the same as the revision number corresponding to the current version of the document, it may be determined that the first version of the document is the current version of the document. Alternately, if the first revision number is less than the revision number corresponding to the current version of the document, it may be determined that the version of the document is outdated and is not the current version of the document.

In block 526, if it is determined that the first version of the document is the current version of the document, the first set of one or more changes is saved by the version control server.

Or, in block 528, if it is determined that the first version of the document is not the current version of the document, the first set of one or more changes is rejected.

Alternately or additionally, when the first version of the document is the current version of the document, the method 520 may further include sending the first client device a notification that the first set of one or more changes was saved by the version control server.

Alternately or additionally, when the first version of the document is not the current version of the document, the method 520 may further include sending a rejection of the first set of one or more changes to the first client device. In these and other embodiments, a second set of one or more changes made to the document at a second client device and synced to the version control server to create a second version of the document prior to the version control server receiving the first set of one or more changes from the first client device may be sent to the first client device.

Prior to receiving the first set of one or more changes from the first client device, the version control server may receive, from the second client device, the first revision number indicating the first version of the document and the second set of one or more changes made at the second client device to the first version of the document. It may be determined that the first version of the document is the current version of the document. The second set of one or more changes may be saved by the version control server to create the second version of the document. A notification may be sent to the second client device that the second set of one or more changes was saved at the version control server.

Alternately or additionally, after sending the second set of one or more changes to the first client device, a second revision number indicating the second version of the document may be received from the first client device. At least one of the first set of one or more changes made at the first client device to the second version of the document may be received from the first client device. The at least one of the first set of one or more changes may include as many of the first set of one or more changes as possible given any differences between the first and second versions of the document. It may be determined that the second version of the document is the current version of the document. The at least one of the first set of one or more changes may be saved by the version control server to create a third version of the document. A notification may be sent to the first client device that the at least one of the first set of one or more changes was saved at the version control server.

Some embodiments disclosed herein include an article of manufacture such as a computer storage medium having instructions stored thereon that are executable by a computing device to perform operations included in the method 520 of FIG. 5C, such as the operations illustrated by blocks 522, 524, 526 and/or 5258 in FIG. 5C, and/or variations thereof. The computer storage medium may be included in the server 10 of FIG. 1. The computing device may include the server 102, and/or a processor or other processing device of the server 102.

Figure 6:
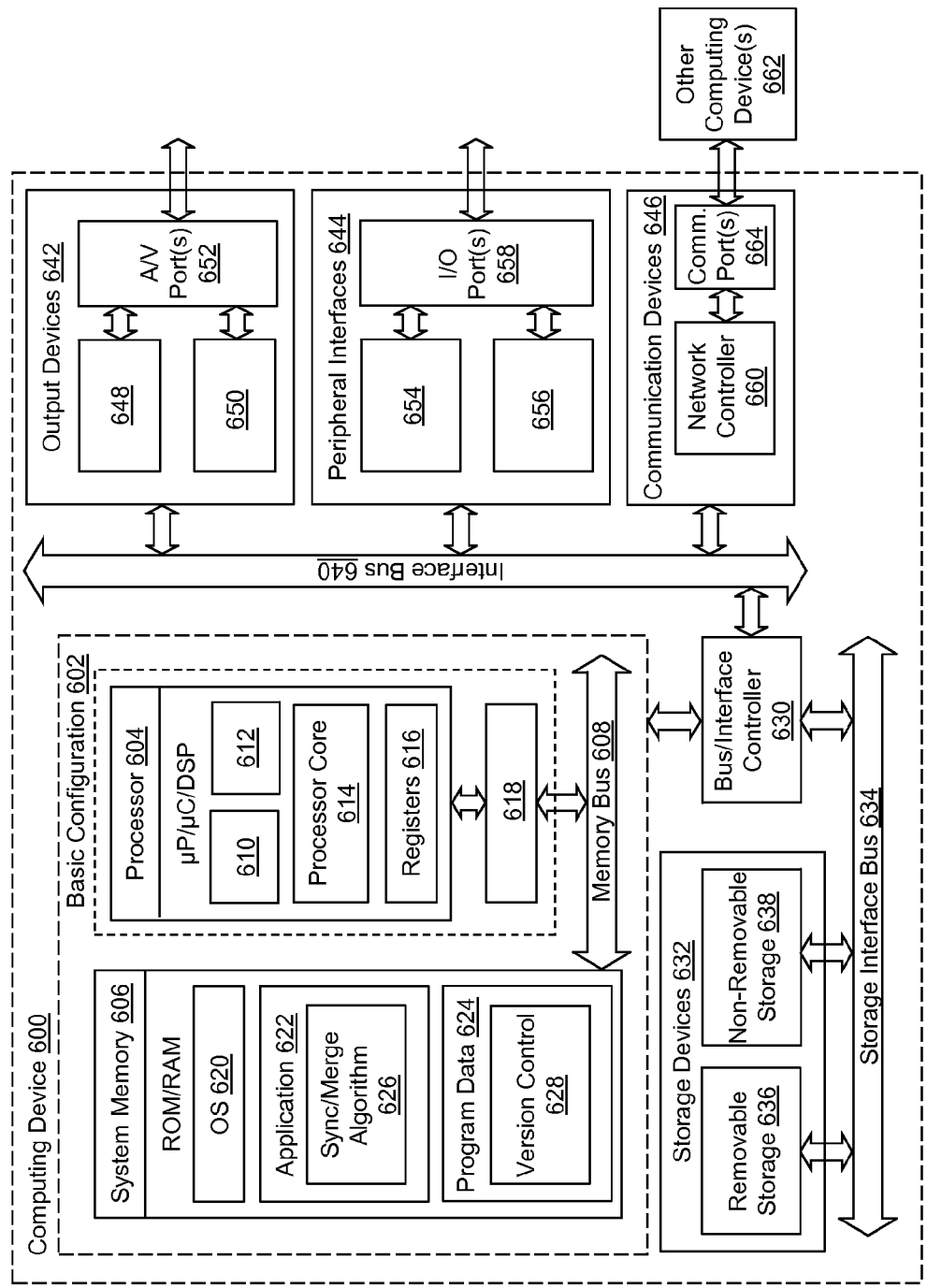
FIG. 6 is a block diagram illustrating an example computing device that is arranged for synchronizing browser documents and/or version control.

FIG. 6 is a block diagram illustrating an example computing device that is arranged for synchronizing browser documents and/or version control, in accordance with at least some embodiments described herein. The computing device 600 may be included in any of the client devices 104 and/or server 102 of FIG. 1, for example. In a very basic configuration 602, the computing device 600 typically includes one or more processors 604 and a system memory 606. A memory bus 608 may be used for communicating between the processor 604 and the system memory 606.

Depending on the desired configuration, the processor 604 may be of any type including but not limited to a microprocessor (µP), a microcontroller (µC), a digital signal processor (DSP), or any combination thereof. The processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an OS 620, one or more applications 622, and program data 624. The application 622 may include a synchronization and merging algorithm 626 that is arranged to perform one or more of the functions as described herein including those described with respect to the methods 500, 510 and/or 520 of FIGS. 5A-5C. The program data 624 may include version control data 628 such as branches or revision lists corresponding to document instances open in browser windows on client devices, such as the client devices 104 of FIG. 1. In some embodiments, the application 622 may be arranged to operate with the program data 624 on the OS 620 such that implementations of methods for synchronizing browser documents and methods of version control such as methods 500, 510 and 520 of FIGS. 5A-5C may be provided as described herein. This described basic configuration 602 is illustrated in FIG. 6 by those components within the inner dashed line.

The computing device 600 may have additional features or functionality, and additional interfaces to facilitate communications between the basic configuration 602 and any required devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (e.g., output devices 642, peripheral interfaces 644, and communication devices 646) to the basic configuration 602 via the bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 may also be implemented as a personal computer including both laptop computer and non-laptop computer configurations.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for synchronizing browser documents, the method comprising:
   losing a connection to a version control server at a client device having a first instance of a document open in a first browser window of a browser and a second instance of the document open in a second browser window of the browser;
   storing a first branch corresponding to the first instance of the document in local storage associated with the browser, the first branch indicating whether the first instance of the document is open or abandoned and one or more first changes;
   the second browser window automatically determining that the first instance of the document is abandoned; and
   the second browser window automatically merging the one or more first changes into the second instance of the document in response to determining that the first instance of the document is abandoned.

2. The method of claim 1, further comprising deleting the first branch after merging the one or more first changes into the second instance of the document.

3. The method of claim 1, further comprising storing a second branch corresponding to the second instance of the document in the local storage associated with the browser, the second branch indicating whether the second instance of the document is open or abandoned and one or more second changes such that the one or more second changes can be merged into other instances of the document opened in other browser windows after the second instance of the document is abandoned.

4. The method of claim 3, wherein merging the one or more first changes into the second instance of the document includes applying at least some of the one or more first changes to the second instance of the document and adding the at least some of the one or more first changes to the second branch stored in the local storage associated with the browser.

5. The method of claim 1, further comprising receiving input effective to cause the one or more first changes in the first instance of the document after losing the connection to the version control server.

6. The method of claim 1, further comprising, prior to the second browser window automatically determining that the first instance of the document is abandoned, the first browser window periodically marking the first branch as open, wherein the second browser window automatically determining that the first instance of the document is abandoned includes the second browser window determining that a last time the first branch was marked as open occurred more than a predetermined threshold amount of time prior to a current time.

7. The method of claim 1, further comprising, prior to the second browser window automatically determining that the first instance of the document is abandoned, the second browser window periodically polling the local storage associated with the browser to determine whether any branches of the document, including the first branch, are abandoned.

8. The method of claim 1, wherein the first branch further indicates a revision number of the document identifying a version of the document to which the one or more first changes were applied.

9. The method of claim 1, further comprising designating one of a plurality of browser windows that include the first and second browser windows as a master syncer responsible for syncing all changes for all instances of all documents that are open on the client device to the version control server when the client device is connected to the version control server.

10. The method of claim 9, further comprising:
reconnecting the client device to the version control server;
the master syncer periodically polling the local storage to determine any instances of any documents that have been abandoned, each of the instances having a corresponding branch stored in the local storage and each branch indicating one or more changes to a corresponding document; and
the master syncer syncing the one or more changes of each branch corresponding to each abandoned instance to the version control server.

11. The method of claim 10, further comprising:
the master syncer receiving one or more updates from the version control server to one or more documents, each of the one or more documents having at least one instance open in a corresponding browser window on the client device;
the master syncer distributing the one or more updates to one or more corresponding browser windows; and
each of the one or more corresponding browser windows merging the one or more updates into a corresponding instance of the document.

12. An article of manufacture comprising a non-transitory computer readable storage medium having instructions stored thereon that are executable by a computing device to perform the method of claim 1.

13. A method of version control implemented substantially without human intervention, the method comprising:
at a first client device having a document open in a browser window, sending to a version control server a first revision number indicating a first version of the document and a first set of one or more changes made at the first client device to the first version of the document;
in response to the version control server determining that the first version of the document is outdated, receiving, from the version control server, a rejection of the first set of one or more changes;
receiving, from the version control server, a second set of one or more changes made to the document at a remote client device and synced to the version control server prior to the version control server receiving the first set of one or more changes from the first client device;
merging the second set of one or more changes into the first version of the document to create a second version of the document; and
syncing at least one of the first set of one or more changes to the version control server based on the second version of the document.

14. The method of claim 13, wherein merging the second set of one or more changes into the first version of the document to create a second version of the document includes:
undoing the first set of one or more changes made to the first version of the document; and
applying the second set of one or more changes to the first version of the document to create the second version of the document.

15. The method of claim 14, wherein syncing at least one of the first set of one or more changes to the version control server based on the second version of the document includes:
applying at least one of the first set of one or more changes to the second version of the document, the at least one of the first set of one or more changes including as many of the first set of one or more changes as possible given any differences between the first and second versions of the document;
sending to the version control server a second revision number indicating the second version of the document and the at least one of the first set of one or more changes made at the first client device to the second version of the document; and
in response to the version control server determining that the second version of the document is a current version of the document, receiving, from the version control server, a notification that the at least one of the first set of one or more changes was saved by the version control server.

16. The method of claim 13, further comprising:
sending to the version control server a third revision number indicating a third version of the document and a third set of one or more changes made at the first client device to the third version of the document; and
in response to the version control server determining that the third version of the document is a current version of the document, receiving, from the version control server, a notification that the third set of one or more changes was saved by the version control server.

17. The method of claim 13, wherein the first client device has first and second instances of the document open in first and second browser windows of a browser, the method further comprising:
losing a connection to the version control server at the first client device;
storing a first and a second branch corresponding to the first and the second instance of the document in local storage associated with the browser, each branch indicating whether the corresponding instance of the document is open or abandoned and one or more changes made to the corresponding instance of the document;
the second browser window automatically determining that the first instance of the document is abandoned; and
the second browser window automatically merging the one or more changes made to the first instance of the document into the second instance of the document in response to determining that the first instance of the document is abandoned.

18. An article of manufacture comprising a non-transitory computer readable storage medium having instructions stored thereon that are executable by a computing device to perform the method of claim 13.

19. A method of version control implemented substantially without human intervention, the method comprising:
- receiving, at a version control server, from a first client device having a document open in a browser window, a first revision number indicating a first version of the document and a first set of one or more changes made at the first client device to the first version of the document;
- determining whether the first version of the document is a current version of the document maintained by the version control server; and
- if the first version of the document is the current version of the document, saving the first set of one or more changes by the version control server; or
- if the first version of the document is not the current version of the document, rejecting the first set of one or more changes.

20. The method of claim 19, wherein determining whether the first version of the document is a current version of the document includes:
- comparing the first revision number to a revision number corresponding to the current version of the document; and
- if the first revision number is the same as the revision number corresponding to the current version of the document, determining that the first version of the document is the current version of the document; or
- if the first revision number is less than the revision number corresponding to the current version of the document, determining that the first version of the document is outdated and is not the current version of the document.

21. The method of claim 19, further comprising, when the first version of the document is the current version of the document, sending the first client device a notification that the first set of one or more changes was saved by the version control server.

22. The method of claim 19, further comprising, when the first version of the document is not the current version of the document:
- sending a rejection of the first set of one or more changes to the first client device; and
- sending, to the first client device, a second set of one or more changes made to the document at a second client device and synced to the version control server to create a second version of the document prior to the version control server receiving the first set of one or more changes from the first client device.

23. The method of claim 22, further comprising, prior to receiving the first set of one or more changes from the first client device:
- receiving, from the second client device, the first revision number indicating the first version of the document and the second set of one or more changes made at the second client device to the first version of the document;
- determining that the first version of the document is the current version of the document;
- saving the second set of one or more changes by the version control server to create the second version of the document; and
- sending the second client device a notification that the second set of one or more changes was saved at the version control server.

24. The method of claim 22, further comprising, after sending the second set of one or more changes to the first client device:
- receiving, from the first client device, a second revision number indicating the second version of the document;
- receiving, from the first client device, at least one of the first set of one or more changes made at the first client device to the second version of the document, the at least one of the first set of one or more changes including as many of the first set of one or more changes as possible given any differences between the first and second versions of the document;
- determining that the second version of the document is the current version of the document;
- saving the at least one of the first set of one or more changes by the version control server to create a third version of the document; and
- sending the first client device a notification that the at least one of the first set of one or more changes was saved at the version control server.

25. An article of manufacture comprising a non-transitory computer readable storage medium having instructions stored thereon that are executable by a computing device to perform the method of claim 19.

* * * * *